United States Patent [19]
Knott, Sr.

[11] Patent Number: 5,967,086
[45] Date of Patent: Oct. 19, 1999

[54] AQUACULTURE METHOD AND APPARATUS

[76] Inventor: James M. Knott, Sr., 456 Hill St., Whitinsville, Mass. 01588

[21] Appl. No.: 08/965,315

[22] Filed: Nov. 6, 1997

[51] Int. Cl.$^6$ .......................... A01K 71/00; A01K 63/00
[52] U.S. Cl. .............................. 119/223; 119/452; 43/102
[58] Field of Search ..................................... 119/223, 215, 119/217, 221, 222, 452, 459, 200; 43/55, 56, 102

[56] References Cited

U.S. PATENT DOCUMENTS

| | | | |
|---|---|---|---|
| 268,558 | 12/1882 | Small . | |
| 2,603,028 | 7/1952 | Roberts | 43/55 |
| 2,854,782 | 10/1958 | Daugherty | 43/55 |
| 3,374,770 | 3/1968 | Freudenberger | 119/3 |
| 3,683,854 | 8/1972 | Lewis | 119/217 |
| 4,003,338 | 1/1977 | Neff et al. | 119/223 |
| 4,079,698 | 3/1978 | Neff et al. | 119/223 |
| 4,084,543 | 4/1978 | Pequegnat | 119/3 |
| 4,244,323 | 1/1981 | Morimura | 119/3 |
| 4,257,350 | 3/1981 | Streichenberger | 119/3 |
| 4,416,082 | 11/1983 | Strobel | 43/102 |
| 4,858,372 | 8/1989 | Ray | 43/55 |
| 4,890,413 | 1/1990 | Nelson et al. | 43/55 |
| 5,009,189 | 4/1991 | Neff | 119/3 |
| 5,429,074 | 7/1995 | Nelson et al. | 119/239 |
| 5,448,964 | 9/1995 | Takimoto | 119/17 |
| 5,549,076 | 8/1996 | Kaarstad | 119/223 |
| 5,617,813 | 4/1997 | Loverich et al. | 119/223 |
| 5,628,279 | 5/1997 | Bones, IV | 119/215 |

Primary Examiner—Jack W. Lavinder
Assistant Examiner—Yvonne R. Abbott
Attorney, Agent, or Firm—John E. Toupal; Harold G. Jarcho

[57] ABSTRACT

An aquaculture system including an upper support for disposition at the surface of a water body of an aquaculture farm; a cage having a side wall portion and a bottom wall portion, the side wall portion having an upper edge secured to the upper support so as to project below the surface of the water body and the side wall portion being formed out of vertically contractible, non-buoyant mesh; and a lower support disposed between a bottom edge of the side wall portion and an outer edge of the bottom wall portion.

14 Claims, 2 Drawing Sheets

AQUACULTURE METHOD AND APPARATUS

BACKGROUND OF THE INVENTION

This invention relates generally to an aquaculture method and apparatus and, more particularly, to an aquaculture method and apparatus employing a cage formed out of a vertically contractible, non-buoyant mesh material.

Aquaculture is a rapidly expanding industry providing increasing quantities of various fish products. In comparison to conventional commercial fishing techniques, aquaculture offers the advantages of a predictable harvest and reduced labor and equipment cost. However, present systems are plagued with a variety of serious problems.

Typical aquaculture systems utilize weighted, fiber mesh nets suspended in a suitable water body by floatation rings. After a given growth period, the cage is lifted to the surface of the water body for harvest of a retained fish crop. Serious losses are caused in such aquaculture systems by large aquatic predators such as sharks, tuna and seals that easily penetrate the fiber mesh nets and feed upon the resident fish. Further losses occur when remaining fish escape through the openings created in the net by the predators.

To alleviate the predator problem, many aquaculture systems provide an auxiliary net that surrounds and is spaced from the fish retaining primary net. However, such protective netting also is subject to penetration by predators. Other disadvantages of currently employed fiber mesh nets are a requirement for extensive anchoring and a tendency for the flexible nets to be displaced by tidal flows and thereby undesirably crowd resident fish.

The object of this invention, therefore, is to provide an improved aquaculture system that reduces problems inherently present in existing systems.

SUMMARY OF THE INVENTION

The invention is an aquaculture system including an upper support for disposition at the surface of a water body of an aquaculture farm; a cage having a side wall portion and a bottom wall portion, the side wall portion having an upper edge secured to the upper support so as to project below the surface of the water body and the side wall portion being formed out of vertically contractible, non-buoyant mesh; and a lower support disposed between a bottom edge of the side wall portion and an outer edge of the bottom wall portion.

According to one feature of the invention, the mesh is formed out of metallic, corrosion-resistant wire having a diameter greater than twenty (20) gauge wire. These features prevent corrosion of the cage and establish desired strength and rigidity characteristics therefor.

According to another feature of the invention, the wire is formed out of a material selected from the group consisting of stainless steel, aluminum, plastic-coated metal, copper, cupro-nickel or monel. These materials are particularly well suited for aquaculture use.

According to still another feature of the invention, the cage has substantial planar rigidity so as to resist horizontal deformation in response to water creature impact and water currents. This feature prevents penetration of the cage by predators or deformation of the cage which could cause crowding of retained fish.

According to yet another feature, the system includes a lift mechanism operable to apply an upwardly directed force to the lower support and thereby produce upward contraction of the side wall portion through the water body. Contraction of the side wall portion facilitates harvest of fish retained within the cage.

According to a further feature of the invention, the lift mechanism includes a buoy attached to a bottom portion of the cage and having a buoyant active state and a non-buoyant inactive state; the buoy providing in its active state the upwardly directed force. The buoy is a highly efficient mechanism for producing the desired contraction of the side wall of the cage.

According to additional features, the buoy defines a floatation chamber and water inlet openings communicating therewith, and the lift mechanism also includes a control system for discharging water from the floatation chamber to provide the active state of the buoy. These features efficiently provide the desired active buoyant state for the buoy.

According to additional features of the invention, the lower support is a tube defining the floatation chamber, and the control system includes an air compressor communicating with the floatation chamber. The compressor efficiently provides the desired buoyant state for the buoy.

Also encompassed by the invention is an aquaculture method including the steps of: providing a non-buoyant, mesh cage having a contractible side wall portion and a bottom wall portion; submerging the cage in a water body; growing a fish crop within the cage; applying an upwardly directed force to a bottom portion of the cage so as to produce upward movement of the bottom wall portion and vertical contraction of the side wall portion; and harvesting at the surface of the water body the fish crop within the cage. This method substantially enhances the efficiency of aquaculture fish harvesting.

According to one feature of the method, the providing step includes forming the cage out of a metallic, non-corrosive wire having a gauge which provides for the cage substantial planar rigidity that resists deformation by impacting water creatures. The rigid cage resists penetration of the cage by predators.

According to another feature of the method, the mesh is a linked spiral mesh. The linked spiral mesh facilitates contraction of the side wall portion.

According to other features of the method, the applying step includes the steps of securing to a bottom portion of the cage a buoy mechanism having a buoyant, active state and a non-buoyant, inactive state; and producing the active state of the buoy mechanism to generate the upwardly directed force. The buoy efficiently provides the desired force to the cage.

According to yet other features of the method, the buoy mechanism defines a floatation chamber and water access openings communicating therewith; and the producing step includes the step of injecting compressed air into the floatation chamber to cause water discharge through the openings and thereby create the active state. These features facilitate creation of the required active buoy state.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
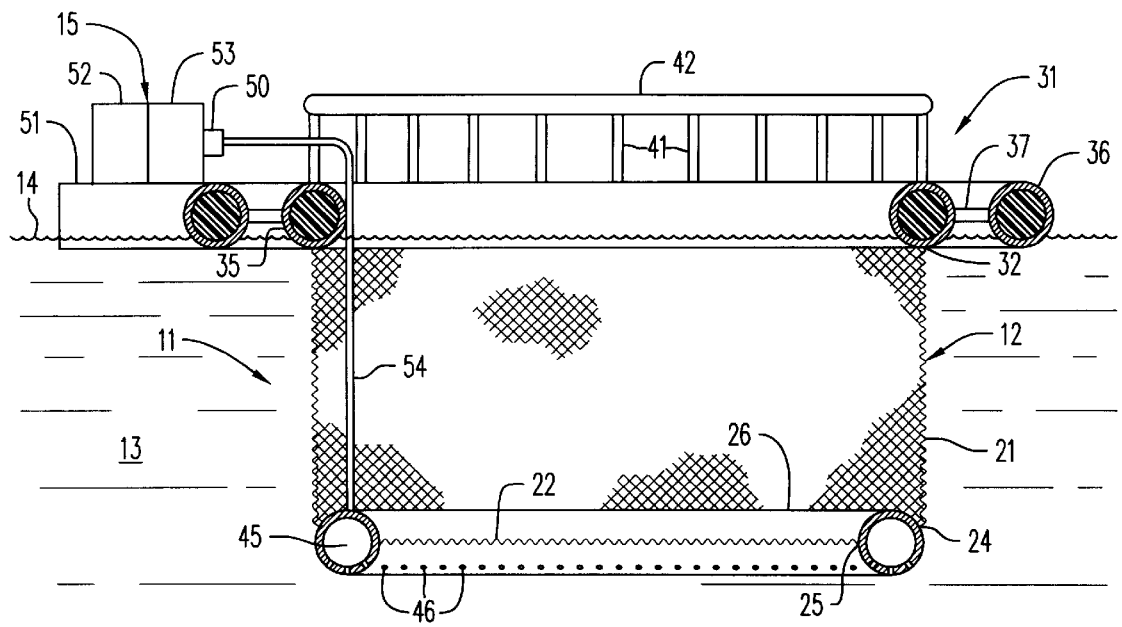
FIG. 1 is an elevational cross sectional view of an aquaculture system according to the invention.
Figure 2:
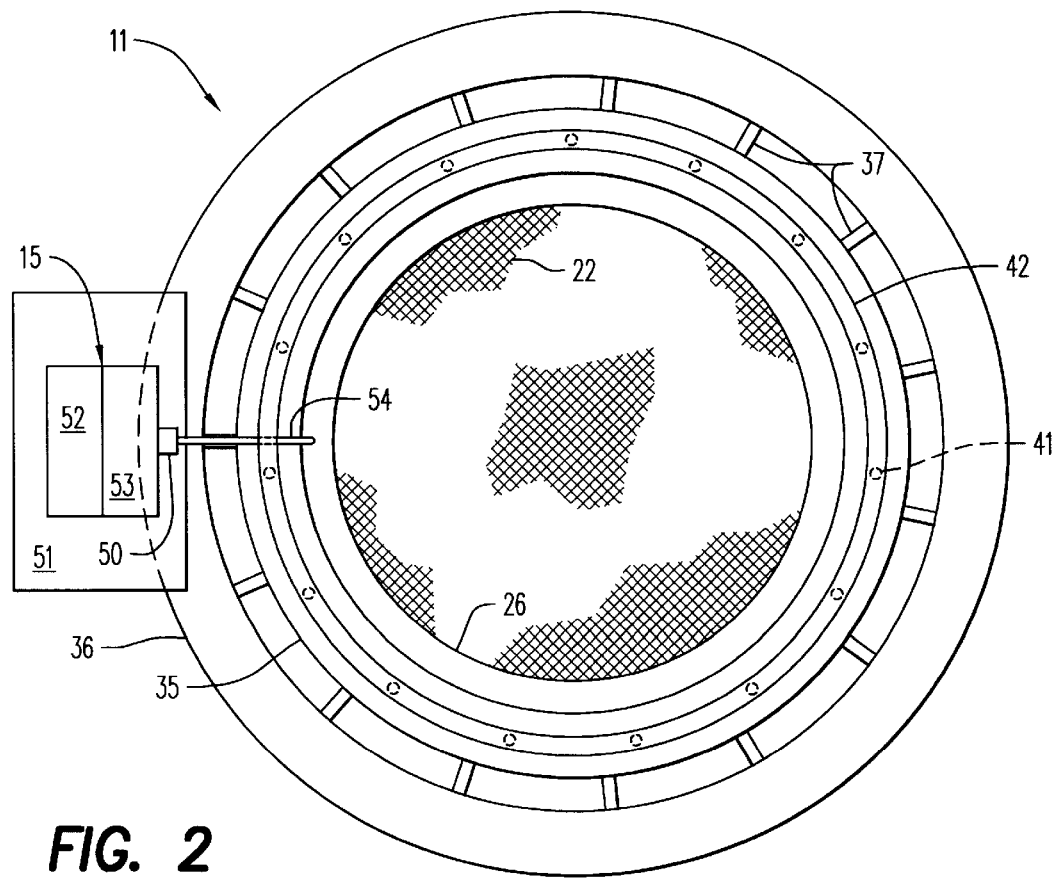
FIG. 2 is a top view of the system shown in FIG. 1.

An aquaculture system 11 includes a cage 12 submerged in a water body 13 having a surface 14. The cage 12 has an annular side wall portion 21 and a circular bottom wall portion 22. Disposed between a bottom edge 24 of the side wall portion 21 and an outer edge 25 of the bottom wall portion 22 is a lower support formed by a circular buoy tube 26. An upper support assembly 31 is secured to an upper edge 32 of the side wall portion 21. Also included in the system 11 is a lift mechanism 15 for producing upward vertical collapse of the cage 12 as described hereinafter.

Figure 3:
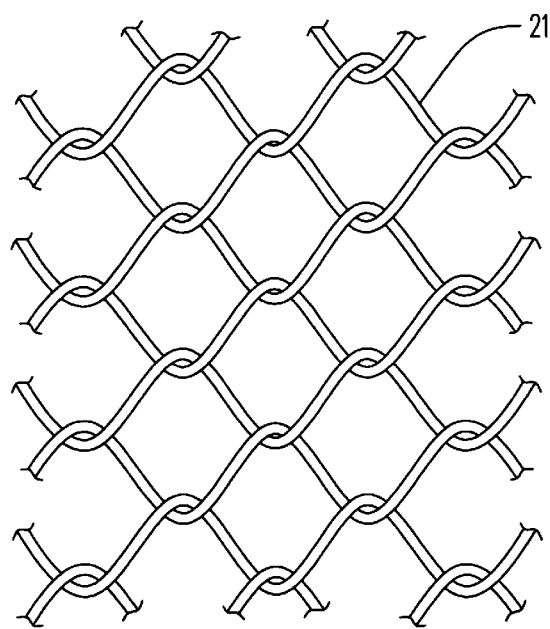
FIG. 3 is a detailed partial view showing construction of a mesh material used in the system shown in FIGS. 1 and 2.

The cage 12 is formed of a metallic, corrosion resistant wire mesh having substantial planar rigidity so as to resist horizontal deformation in response to water creature impact and water currents. Preferably, the wire forming the cage 12 has a diameter greater than twenty (20) guage wire and is selected from a group consisting of stainless steel, aluminum, plastic coated metal, copper, cupro-nickel, monel, galvanized steel, galvanized (5% aluminum 94% zinc+mishmetal) steel, and aluminized steel. At least the side wall portion 21 of the cage 12 is formed out of a non-buoyant, contractible mesh material such as that shown in FIG. 3. To provide the desired contractibility, the side wall portion 21 of the cage 12 preferably is constructed of a linked spiral mesh (FIG. 3) typically used in conventional chain link fence.

The upper support assembly 31 includes a sealed, buoyant inner tube 35 attached to the upper edge 32 of the side wall portion 21 and a sealed, buoyant outer tube 36 attached to the inner tube 35 by a plurality of struts 37. To enhance and ensure buoyancy, the inner and outer tubes 36 preferably are filled with a suitable buoyant foam. Supported above the inner tube 35 by circumferentially spaced apart ballasters 41 is a railing 42. The railing 42 provides a support for a cover assembly (not shown) which isolates the cage 12 from flying predators. Defined by the circular buoy tube 26 is an annular floatation chamber 45 and a plurality of water inlet openings 46 communicating with a bottom portion thereof. The openings 46 allow water access to the floatation chamber 45 to establish for the buoy tube 26 an inactive, non-buoyant state.

The lift mechanism 15 includes a buoyant platform 51 attached to the outer tube 36. Supported by the platform 51 is a control system 52 and air compressor 53 controlled thereby. An air hose 54 is connected via a check valve 50 between the compressor 53 and the buoy tube 26. In response to the control system 52, the compressor 53 injects high pressure air into the buoy tube 26 to cause discharge of water through the openings 46 and thereby create an active, buoyant state for the buoy tube 26.

Figure 4:
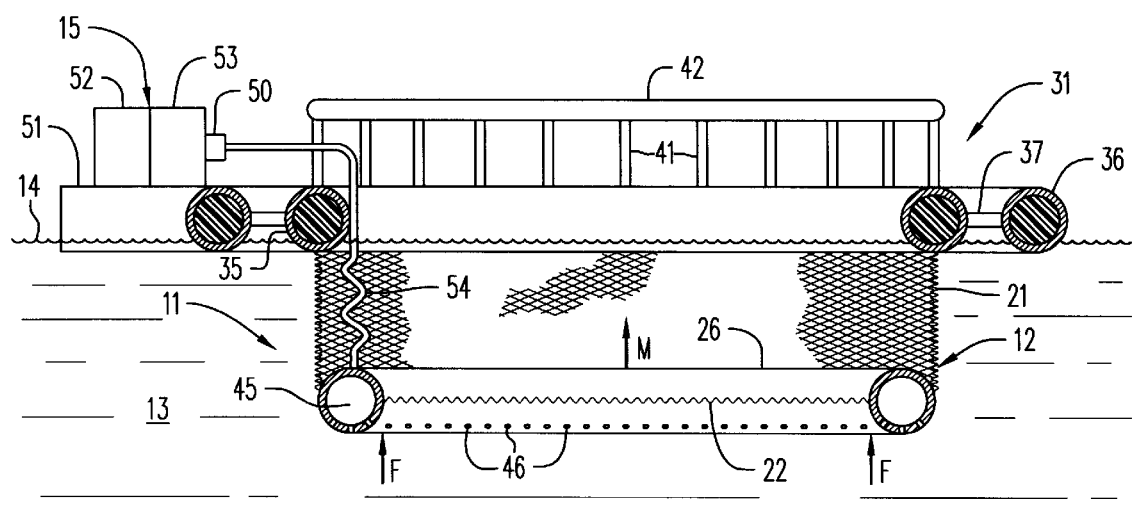
FIG. 4 is an elevational view illustrating fish harvesting operations of the system.

According to a preferred method of using the aquaculture system 11, a suitable quantity of young fish such as salmon is deposited into the cage 12. Consequently, after a time period required for the fish to reach marketable size, they are harvested in the following manner. The compressor 53 is activated to induce discharge of water from the openings 46 in the buoy tube 26 creating therefor its active buoyant state. In that state, the buoy tube 26 applies an upwardly directed force F on the cage 12 to produce upward movement M of the buoy tube 26 and resultant contraction of the side wall portion 21 as shown in FIG. 4. The air pressure within the tube 26 is slowly increased and controlled to produce gradual upward movement M of the tube 26 and resultant diminution in the depth of the cage 12. During this contraction of the cage 21, the bottom wall portion 22 of the cage 12 gradually moves the fish content of the cage 12 toward the water surface 14 where the fish are harvested by conventional harvesting equipment (not shown). After completion of the harvest, air pressure within the floatation chamber 45 is released allowing water to enter the openings 46 and again create the non-buoyant, inactive state of the tube 26. Consequently, the tube 26 sinks into the water body 13 expanding the side wall portion 21 and forming the full cage volume shown in FIG. 1. A new fish growth cycle then is commenced.

Obviously, many modifications and variations of the present invention are possible in light of the above teachings. It is to be understood, therefore, that the invention can be practiced otherwise than as specifically described.

What is claimed is:

1. An aquaculture system comprising:
   an upper support for disposition at the surface of a water body of an aquaculture farm;
   a cage having a side wall portion and a bottom wall portion; said side wall portion having an upper edge secured to said upper support so as to project below the surface of the water body, and said side wall portion being a vertically contractible, non-buoyant linked-spiral mesh formed from corrosion-resistant metallic wire and having a diameter greater than 20 gauge wire with a substantial planar rigidity so as to resist horizontal deformation in response to water creature impact and water currents; and
   lower support means secured to a bottom portion of said cage.

2. A system according to claim 1 wherein said lower support means is disposed between a bottom edge of said side wall portion and an outer edge of said bottom wall portion.

3. A system according to claim 1 wherein said wire is formed out of a material selected from the group consisting of stainless steel, aluminum, plastic-coated metal, copper, cupro-nickel, monel, galvanized steel, galvanized (5% aluminum 94% zinc+mishmetal) steel, and aluminized steel.

4. An aquaculture method comprising the steps of:
   providing a non-buoyant, mesh cage having a contractible side wall portion and a bottom wall portion;
   submerging said cage in a water body;
   growing a fish crop within said cage;
   applying an upwardly directed force to a bottom portion of said cage so as to produce upward movement of said bottom wall portion and vertical contraction of said side wall portion; and
   harvesting at the surface of the water body the fish crop within said cage.

5. A method according to claim 4 wherein said providing step comprises the step of forming said side wall portion out of a metallic, non-corrosive wire having a gauge that provides for said side wall portion a substantial planar rigidity that resists deformation by impacting water creatures.

6. A method according to claim 5 wherein said mesh is a flattened linked-spiral mesh.

7. A method according to claim 5 wherein said wire is formed out of a material selected from the group consisting of stainless steel, aluminum, plastic-coated metal, copper, cupro-nickel, monel, galvanized steel, galvanized (5% aluminum 94% zinc+mishmetal) steel, and aluminized steel.

8. A method according to claim 4 wherein said applying step comprises the steps of securing to a bottom portion of said cage a buoy mechanism having a buoyant, active state and a non-buoyant, inactive state; and producing said active state of said buoy mechanism to generate said upwardly directed force.

9. A method according to claim 8 wherein said buoy mechanism defines a floatation chamber and water access openings communicating with a lower portion thereof; said producing step comprises the step of injecting compressed air into said floatation chamber to cause water discharge through said openings and thereby create said active state.

10. An aquaculture system comprising:
   an upper support for disposition at the surface of a water body of an aquaculture farm;
   a cage having a side wall portion and a bottom wall portion; said side wall portion having an upper edge secured to said upper support so as to project below the surface of the water body, and said side wall portion being a vertically contractible, non-buoyant mesh formed from corrosion-resistant metallic wire having substantial planar rigidity so as to resist horizontal deformation in response to water creature impact and water currents;
   lower support means secured to a bottom portion of said cage; and
   powered lift means operable to apply an upwardly directed force to said lower support means and thereby produce upward contraction of said side wall portion through the water body.

11. A system according to claim 10 wherein said lift means comprises buoy means attached to said bottom portion of said cage and having a buoyant active state and a non-buoyant inactive state; said buoy means providing in said active state said upwardly directed force.

12. A system according to claim 11 wherein said buoy means defines a floatation chamber, water inlet openings communicating with a lower portion of said floatation chamber and allowing water access to said floatation chamber so as to provide said inactive state, and control means for discharging water from said floatation chamber to provide said active state of said buoy means.

13. A system according to claim 12 wherein said lower support means is a tube defining said floatation chamber, and said control means comprises an air compressor communicating with said floatation chamber.

14. A system according to claim 12 wherein said buoy means is attached between a bottom edge of said side wall portion and an outer edge of said bottom wall portion.

* * * * *